A. J. ANDERSON.
DEMOUNTABLE RIM FOR MOTOR VEHICLES.
APPLICATION FILED MAR. 29, 1919.
1,315,199.
Patented Sept. 9, 1919.
2 SHEETS—SHEET 1.
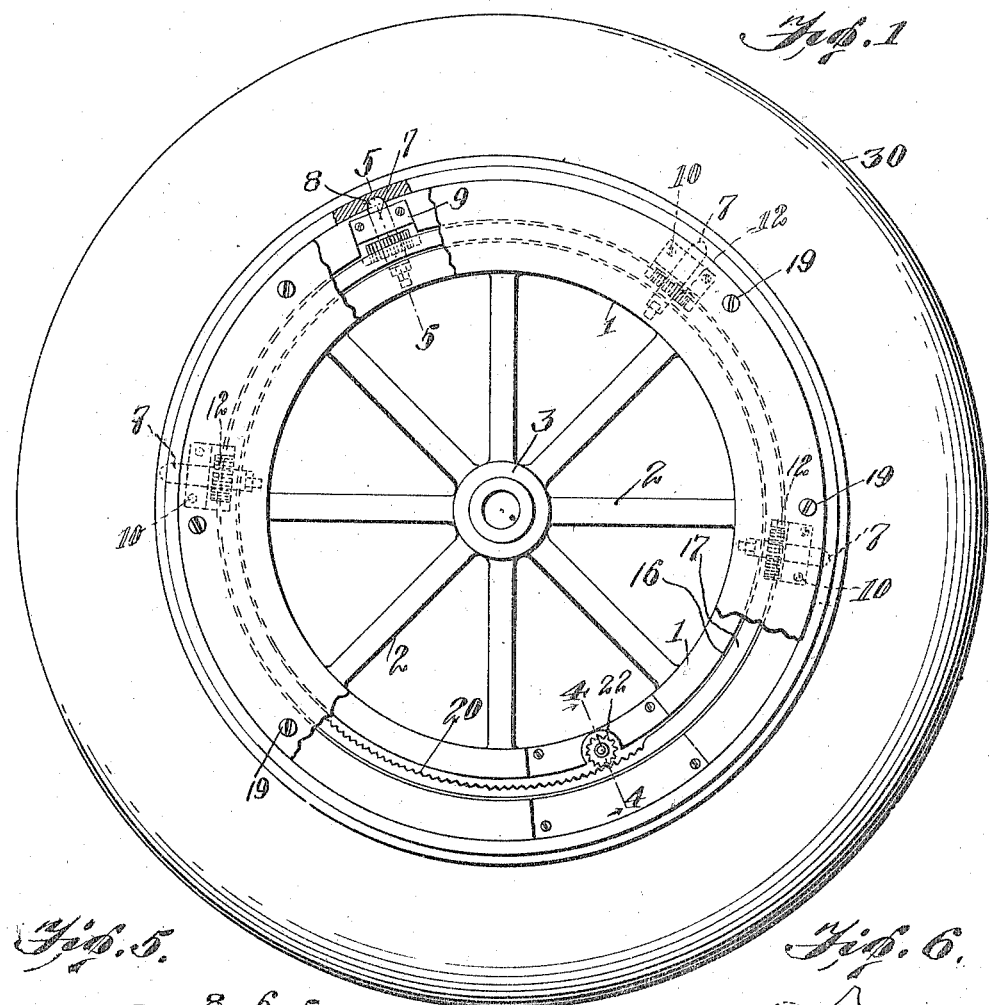
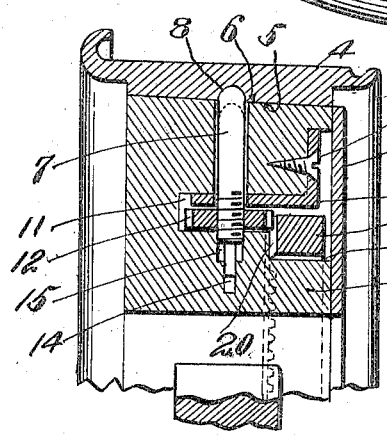
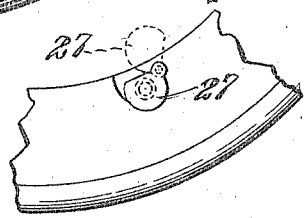
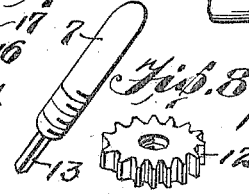
Inventor
A. J. ANDERSON.

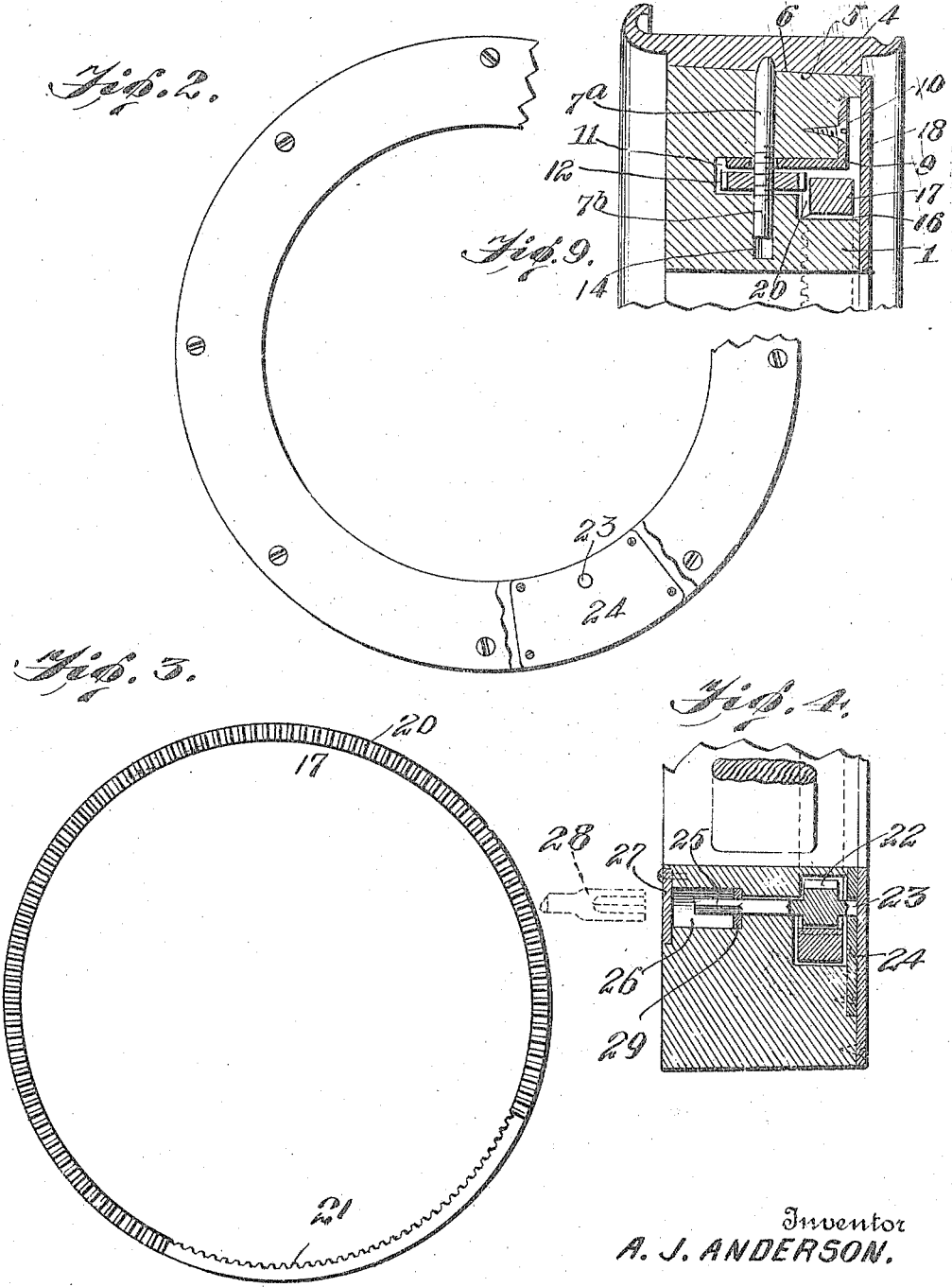

UNITED STATES PATENT OFFICE.

ARTHUR JAMES ANDERSON, OF BINFORD, NORTH DAKOTA.

DEMOUNTABLE RIM FOR MOTOR-VEHICLES.

1,315,199.

Specification of Letters Patent.   Patented Sept. 9, 1919.

Application filed March 29, 1919.   Serial No. 286,091.

*To all whom it may concern:*

Be it known that I, ARTHUR JAMES ANDERSON, a citizen of the United States, residing at Binford, in the county of Griggs and State of North Dakota, have invented certain new and useful Improvements in Demountable Rims for Motor-Vehicles, of which the following is a specification, reference being had therein to the accompanying drawings.

This invention relates to a demountable rim for the wheels of motor vehicles, on which wheels are preferably mounted pneumatic tires.

The object of the invention is the provision of simple and efficient means for quickly and efficiently permitting the removal of the rim of a wheel, and quickly and efficiently allowing the rim, when placed upon the wheel, to be securely fastened thereon.

With this and other objects in view, my invention consists of certain novel constructions, combinations, and arrangements of parts as will be hereinafter fully described and claimed.

In the drawings,

Figure 1 is a view in side elevation of a wheel equipped with my improved mechanism, portions of the felly plate being broken away to show the interior structure of the mechanism.

Fig. 2 is a view in side elevation of the felly of a wheel constructed in accordance with the present invention, showing the part of the felly plate broken away showing the auxiliary bearing plate in elevation.

Fig. 3 is an edge view, in elevation, of the rotatable driving ring.

Fig. 4 is a transverse sectional view taken on line 4—4, Fig. 1, looking in the direction of the arrows.

Fig. 5 is an enlarged sectional view taken on line 5—5, Fig. 1.

Fig. 6 is a fragmentary view, in side elevation, of the felly showing the pivoted cover plate.

Fig. 7 is a perspective view of one of the bolts, while

Fig. 8 is a perspective view of the pinion normally carried by each bolt.

Fig. 9 is a view similar to Fig. 5, of another embodiment of the present invention.

Referring to the drawings by numerals, in the construction of my improved mechanism for quickly attaching and detaching a rim, I employ a felly 1 mounted upon spokes 2 and hub 3. The felly 1 is provided with a detachable rim 4 of any desired construction for receiving a tire, the rim 4 being provided with an inner, inclined face 5 that rides upon the similarly-constructed outer face 6 of the felly 1 (Fig. 5). When the rim 4 is forced upon the felly 1 and "wedged" thereon by reason of the inclined, engaging faces 3 and 4, there will be required locking bolts 7 (entering sockets 8 at their upper ends) to securely retain the detachable rim 4 upon felly 1.

The locking bolts 7 are threaded (Fig. 5), and these bolts pass through angle plates 9, which plates are detachably secured, by screws 10, in the sockets 11, in which sockets 11 are also positioned the pinions 12, which pinions 12 are threaded upon the threaded portions of the bolts 7, so that when rotary movement is imparted to pinions 12, bolts 7 will be rotated for adjusting the same with respect to sockets 8 in the rim 4. Each bolt 7 is provided with an integral, reduced, squared extension 13, at its inner end, which squared extension 13 is slidably mounted in a squared socket 14 that opens into the larger socket 15 in which the threaded end of bolt 7 is slidably mounted; this squared extension 13 prevents the bolt 7 from having any rotary movement, thereby making its movement more positive, since pinion 12, when rotated, will quickly actuate the bolt for moving it with respect to the rim 4.

Cut in one side of the felly 1 is an annular groove 16, in which is loosely mounted the driving ring 17. The ring 17 is held in groove 16 by the annular plate 18, which plate 18 is fastened to the side of the felly by means of screws 19.

The driving ring 17 is provided with teeth 20 formed on one edge of the same, and these teeth 20 mesh with the teeth of pinion 12, so that when the ring 17 is rotated, pinion 12 will be rotated for actuating the bolts 7, with reference to causing the same to positively lock the rim 4 upon the felly, or release the rim so that it may be removed off the felly with the tire that may be carried thereon. The driving ring 17 has teeth 21 formed upon its inner face, and teeth 21 mesh with driving pinion 22. This driving pinion is journaled, at its outer end 23, in auxiliary plate 24, and the inner, squared end 25 is positioned in the key socket 26, the outer end of the key socket 26 being closed by the pivotally-mounted cover 27, but when desired, the plate 27 can be swung to the dotted position shown in Fig. 6, and the actuating tool or clamp, shown in dotted lines 28, can be inserted over the squared end 25 within socket 26, thereby rotating pinion 22 for imparting rotary movement to the driving ring 17 for rotating the pinions 12 mounted upon the locking bolts 7.

At the inner end of the key socket or pocket 26 is a bearing plate 29, through which the squared end 25 of pinion 22 projects; this plate 29, as well as the auxiliary plate 24, constitutes an efficient bearing for pinion 22.

From the foregoing description, it will be understood that to lock the rim upon the felly, it will be necessary to first slide or force rim 4 upon the inclined face 5 of the felly, until the rim is fully upon the felly, as shown in Fig. 5, and then by operating the key 28 upon the squared end 25 of pinion 22, the driving ring 17 will be rotated, imparting rotary movement to all the pinions 12 of the bolt devices, causing the several locking bolts 7 to move into engagement with rim 4, by reason of the upper or outer ends of the bolts being seated in the sockets 8. To release the rim 4, all that the operator has to do is to rotate the pinion 22 in the reverse direction, through the medium of the tool 28, causing the bolts 7 to move downwardly or inwardly toward the hub a sufficient distance to move entirely out of the sockets 8 when the rim will be unlocked, permitting the operator to quickly remove the rim (usually carrying a pneumatic tire 30, Fig. 1) from the felly for any desired purpose.

It will be obvious that any number of bolt devices, actuated by the driving ring 17, can be placed upon a wheel constructed in accordance with the present invention, as the number of these devices is entirely optional with the constructor or manufacturer of the wheel and its coöperating parts.

In Fig. 9, I have shown an embodiment of this invention in which all of the parts are similar except bolt 7ᵃ; in this type of a bolt-fastening device, the bolt 7ᵃ is not provided with a squared extension at its inner end, but is elongated so that there is a smooth portion 7ᵇ at its inner end, the threads on the bolt being intermediate its ends, upon which threads or threaded portions of the bolt, pinion 12 is mounted.

I reserve the right to make such alterations and modifications and changes as shall appear to one skilled in the art to which this invention relates, which alterations, modifications, or changes shall be found necessary in the manufacture of my invention, and which shall fairly fall within the scope of the appended claims.

What I claim is:

1. In a mechanism of the class described, the combination with a felly, of a detachable rim mounted upon said felly, a plurality of locking bolts slidably mounted upon the felly and being adapted to engage said rim, pinions rotatably mounted upon said bolts, a rotatable driving ring meshing with said pinions and adapted to be rotated for driving the pinions for actuating the bolts to move the same to a locked or unlocked position, and means for rotating said ring.

2. In a mechanism of the class described, the combination with a felly provided with an outer, beveled face, of a detachable rim provided with an inner, beveled face engaging the outer face of said felly, said rim provided on its inner face with a plurality of sockets, said felly provided with sockets registering with the sockets of said rim, bolts slidably mounted in the sockets of the felly and adapted to enter at their outer ends the sockets in the rim, angle plates detachably secured within said felly said bolts extending through said plates, pinions threaded upon said bolts parallel to a portion of said plates, said felly provided in one face with a collar groove, said pinions extending into a portion of said groove, a driving ring in said annular groove, said ring provided on its edge and on its inner face with teeth, the teeth on the edge of the ring meshing with the teeth on the pinions, a driving pinion provided with a squared, outer portion and an inner extension meshing with the teeth on the inner face of the ring, said felly provided with an auxiliary plate in which the inner extension and the driving pinion are journaled, the squared end of the driving pinion extending into a socket formed in said felly, a plate at the inner end of said last-mentioned socket and supporting the squared end of said pinion, and a pivotally-mounted cap closing the outer end of said last-mentioned socket.

In testimony whereof I hereunto affix my signature.

ARTHUR JAMES ANDERSON.